United States Patent [19]
Bowers et al.

[11] Patent Number: 5,746,417
[45] Date of Patent: May 5, 1998

[54] ADJUSTABLE BALL VALVE

[75] Inventors: David Lamar Bowers; Robert Joseph Brown, both of Cookeville; Royce Chaffin, Baxter; Donnie Ray Hammock; Gerald Patrick McDermott, both of Cookeville, all of Tenn.

[73] Assignee: The Duriron Company, Inc., Dayton, Ohio

[21] Appl. No.: 696,389

[22] Filed: Aug. 14, 1996

Related U.S. Application Data

[63] Continuation-in-part of Ser. No. 391,427, Feb. 16, 1995, abandoned.

[51] Int. Cl.$^6$ ............................................. F16K 5/20
[52] U.S. Cl. ................................. 251/315.12; 251/188
[58] Field of Search .......................... 251/315.12, 317, 251/188

[56] References Cited

U.S. PATENT DOCUMENTS

| | | |
|---|---|---|
| 3,132,836 | 5/1964 | Dickerson et al. . |
| 3,133,722 | 5/1964 | McGuire et al. . |
| 3,171,431 | 3/1965 | Hansen et al. . |
| 3,173,648 | 3/1965 | McGuire et al. ............... 251/188 |
| 3,177,887 | 4/1965 | Priese . |
| 3,192,948 | 7/1965 | Anderson et al. . |
| 3,498,585 | 3/1970 | Temple et al. . |
| 3,610,575 | 10/1971 | Yoneda . |
| 3,656,711 | 4/1972 | Toelke . |
| 3,741,523 | 6/1973 | Scaramucci et al. . |
| 3,814,381 | 6/1974 | Yopp . |
| 3,843,091 | 10/1974 | Gachot . |
| 3,918,681 | 11/1975 | Eberhardt . |
| 4,099,705 | 7/1978 | Runyan . |
| 4,286,614 | 9/1981 | Kacal et al. . |
| 4,327,895 | 5/1982 | Blumenkranz et al. . |
| 4,345,738 | 8/1982 | Ripert . |
| 4,386,756 | 6/1983 | Muchow . |
| 4,671,308 | 6/1987 | Williams et al. . |
| 4,685,611 | 8/1987 | Scobie et al. . |
| 4,911,409 | 3/1990 | Oliver et al. . |
| 4,928,921 | 5/1990 | Steele . |
| 4,934,656 | 6/1990 | Groves et al. . |
| 4,940,208 | 7/1990 | Kemp . |
| 4,953,587 | 9/1990 | Steele . |
| 4,960,262 | 10/1990 | Hashimoto et al. . |
| 4,968,000 | 11/1990 | Hubertson et al. . |
| 4,998,708 | 3/1991 | Pavanel . |
| 5,165,658 | 11/1992 | Spears et al. . |
| 5,169,124 | 12/1992 | Spears et al. . |
| 5,232,200 | 8/1993 | Combeau . |

*Primary Examiner*—John Fox
*Attorney, Agent, or Firm*—Killworth, Gottman, Hagan & Schaeff, L.L.P.

[57] ABSTRACT

An adjustable ball valve assembly having a vertically tapered chamber and an adjustment mechanism is provided. The adjustable ball valve includes a vertically tapered chamber, a ball disposed within said chamber, a valve stem connected to said ball, seat members, which include a rigid, solid support frame encapsulated in a polymeric material, supporting and sealing the ball and having a vertical taper corresponding to the chamber taper, locking members to prevent horizontal or rotational movement of the seat members and an adjustment mechanism for adjusting the seat members vertically within the chamber. The seat members are encapsulated by means of an injection molding process. The process includes providing an injection mold having, among other features, pins which position the support frame to provide for even application of the polymeric material to the support frame.

19 Claims, 9 Drawing Sheets

ADJUSTABLE BALL VALVE

CONTINUATION DATA

This application is a continuation-in-part of U.S. patent application Ser. No. 08/391,427 entitled "Adjustable Ball Valve" which was filed Feb. 16, 1995 now abandoned.

BACKGROUND OF THE INVENTION

The present invention relates generally to a ball valve, and more specifically, to a ball valve which is adjustable within the valve chamber to prevent leakage.

Users of valves have long desired a valve which is capable of satisfactory sealability at higher pressure drops and temperatures. Higher pressure drops place increased stress upon the seals or seats inside the valve. As a result, the valve seals begin to leak or fail completely (a condition known as "blow-out"). To remedy such problems, plug-type valves are preferred for current higher pressure operations because they are frequently adjustable. Common plug valves involve a tapered chamber into which the plug and seats can be forced downward thereby tightening the seal. Further, the inner surface of the valve chamber contains a series of spines or ribs to contain the seats and prevent blow-out.

However, prior art plug valves have a serious drawback in modern applications. Modernization in many production facilities has led to automation of valve operation. Valve automation requires an actuator to turn the valve stem between an open and closed positions. Due to the nature of the valve and the seats, plug valves have a rather large amount of surface area in contact, increasing both the amount of friction and the necessary turning torque an actuator must apply to turn the valve stem. Because actuators are substantially more expensive than valves, the larger the actuator required, the greater the expense. Consequently, when plug valves are employed, larger actuators and greater costs are required.

Ball valves are particularly attractive because they generally require lower turning torque. Again due to the nature of the ball itself and the seat arrangements, ball valves have less surface area in contact requiring lower turning torque than plug valves and, thus, smaller and less expensive actuators. However, ball valves have not previously had satisfactory adjustability. Additionally, as satisfactory reinforcement of the seats to prevent blow-out has not been possible, ball valves are generally not reliable at higher pressure drops. Accordingly, once the seats begin to leak due to wear of the seats, the valve must either be replaced or repaired.

U.S. Pat. No. 3,326,519 to Freed solves some of those problems by providing an encapsulated seat for a plug valve. However, Freed uses a perforated metal sheet as a reinforcing material for his encapsulated seat. A perforated sheet used as a reinforcing material for a valve seat allows the valve seat to deform when exposed to high pressures because the perforations weaken the structural integrity of the sheet.

U.S. Pat. No. 3,132,836 to Dickerson et al. provides for a plug valve having adjustable seats. However, the seats taught by Dickerson et al. require the use of a separate seat ring and a retainer element (seat) for the ring. Because the seat ring and the retainer element are two separate pieces, the seats taught by Dickerson are still susceptible to blow out at higher pressure drops. When a pressure drop occurs, the seat rings, described in Dickerson, can be sucked out of the retainer element destroying the seal between the plug and the valve body and rendering the valve inoperative.

U.S. Pat. Nos. 4,099,705 and 4,327,895 both disclose ball valves with external adjustment, in part, to compensate for seat wear. In both patents, the wear compensation adjustment comprises tightening of a union nut on each end of the valve. The union nut then forces a collar against O-rings which push against the soft seats to tighten the seal. However, neither patent involves an external adjustment involving a tapered chamber whereby the ball is forced into the taper by pressure on the valve seats. Furthermore, both the '705 and '895 patents employ complex three piece valve bodies which introduce additional leak paths. Each leak path then requires an O-ring seal and introduces additional potential failure points for the valve. Finally, both valves will present problems when incorporated into a piping system. If the piping is under compression, additional pressure could be placed on the valve, pressing in sides of the valve and potentially damaging the valve seats with undue pressure. Conversely, if the piping system is under tension, the union nut and threads must be strong enough to pull the tension in order for the nut to be tightened.

Accordingly, the need remains for a ball valve assembly having satisfactory adjustment to compensate for seat wear. Further, the need remains for an adjustable ball valve assembly with satisfactory blow-out prevention that is operable at higher pressure drops.

SUMMARY OF THE INVENTION

The present invention meets this need by providing for an adjustable ball valve. The ball valve of the present invention provides a superior adjustment mechanism over that of the prior art. The adjustment mechanism of the present invention, is externally operated, introduces no additional leak paths beyond those of standard ball valves, is independent of the piping system into which the valve is incorporated, and is operable at higher pressures than conventional ball valves.

In accordance with the present invention, an improved adjustable ball valve assembly is provided. The ball valve assembly comprises a valve body having an internal chamber with a flow channel through both the body and chamber. The internal chamber has a vertical taper whereby the upper portion of the chamber is wider or greater in circumference than the lower portion of the chamber. The vertical taper is from about 1° to about 8°, and preferably from about 2° to about 4°, as measured from a vertical plane through the chamber Further, the taper may be either a flat taper or a conical taper. That is, only the surface of the chamber in contact with the valve seats may be tapered or the entire chamber, preferably generally circular, may be tapered.

The ball valve assembly also includes a ball disposed within the chamber. The ball includes a flow channel through the center. A valve stem is either connected to the ball or part of a one-piece ball and stem assembly. The valve stem is adapted to rotate the ball between an open and closed position. Thus, the valve stem extends beyond the valve body and can be operated either manually or automatically by an actuator.

The ball valve assembly further includes seat members disposed in the chamber for supporting the ball and for providing a seal. The seat members have a sealing surface with both the outer surface of the ball and the inner surface of the chamber. The sealing surface of the seat members which is in contact with the chamber's inner surface has a vertical taper that corresponds to the taper of the chamber. In this fashion, the seat members are free to move vertically within the chamber. However, locking members, such as ribs, pins or preferably depressions, disposed in the chamber prevent the seat members from any substantial rotational or horizontal movement. The seat members may be either metal or ceramic.

The ball valve assembly also includes an external adjustment mechanism. The external adjustment mechanism applies force to the seat members, thereby forcing the ball and seat members further down into the tapered chamber and applying more pressure between the seat members and the sealing surfaces. In this manner, the valve can be externally tightened to compensate for leaking or worn seals yet is independent from the piping system into which the valve is incorporated and does not introduce additional leak paths.

The external adjustment mechanism comprises an adjusting plate adapted to press against the seat members. Preferably, the adjusting plate is adapted by providing a collar between the adjusting plate and the seat members. Adjusting screws extending through the adjusting plate may then be used to apply pressure from the plate to the collar and consequently the seat members. By way of further modification, a thrust plate may be added between the collar and seat members.

In an additional embodiment of the present invention, the seat members of the ball valve assembly are provided with additional support to prevent blow-out of the seats. The additional support is added by providing a rigid, solid support frame encapsulated in a polymeric material. By "solid" it is meant that the support frame is essentially non-perforate. However, the support frame may be solid and still have grooves, indents, notches, and other types of locking channels or areas of reduced thickness therein. Preferably, the polymeric material is a melt-processable polymer, more preferably a melt-processable fluoropolymer. In the preferred seat members, the support frame is preferably a solid metal frame and the polymer is preferably a melt-processable polymer, such as a fluoropolymer. An optional rigid retaining guide may also be provided. The retaining guide surrounds the encapsulated seats to provide additional support against blow-out.

The method of making the encapsulated valve seats of the present invention is believed to be particularly unique. The encapsulated valve seats of this invention are formed by injection molding using a mold which has a means for positioning the support frame in the mold. The mold cavity includes at least three retractable pins which contact the support frame to position it in the center of the mold cavity during the injection of the polymeric material so that the support frame receives an even coverage of polymeric material on each side.

Accordingly, it is an object of the present invention to provide a ball valve comprising a vertically tapered chamber and a mechanism for applying pressure to the valve seats. As a result, a ball valve with superior external adjustment is provided. It is another object of the present invention to a provide a ball valve comprising valve seat members of a rigid support frame encapsulated with a polymeric material. It is a further object to provide a method for encapsulating support members for valve seats in a polymeric material. As a result, a ball valve having satisfactory performance at higher pressure drops is provided. These, and other objects and advantages of the present invention, will become apparent from the following detailed description, the accompanying drawings, and the appended claims.

DETAILED DESCRIPTION OF THE PREFERRED EMBODIMENTS

The present invention concerns an adjustable ball valve. The ball valve is adjusted vertically within the valve chamber to provide superior adjustment when compared to prior art ball valves. Furthermore, the ball valve of the present invention preferably employs seat members with a rigid, solid support frame being encapsulated in a polymeric material. This allows the ball valve of the present invention to reliably operate at higher pressures than conventional ball valves.

Figure 1:
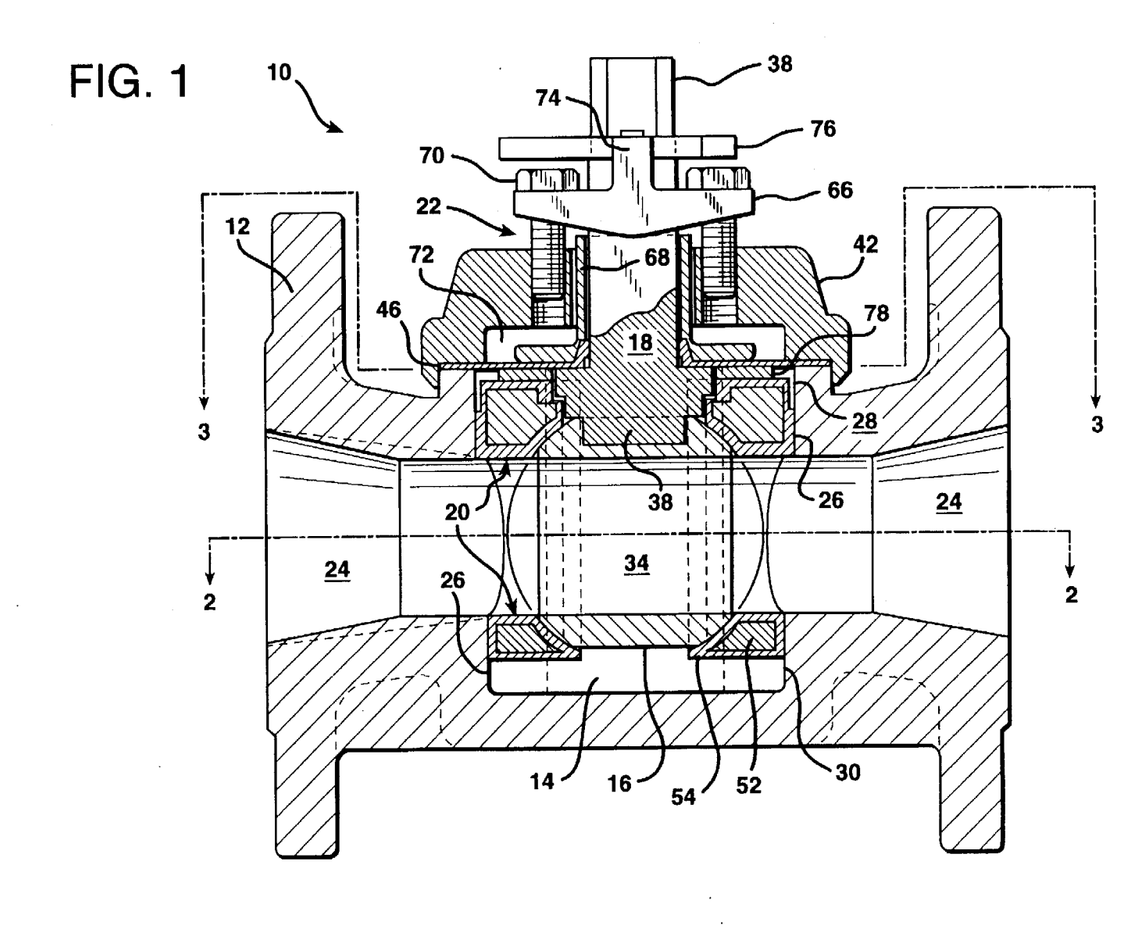
FIG. 1 is a sectional side view of the ball valve of the present invention, taken longitudinally through the center of the valve.
Figure 2:
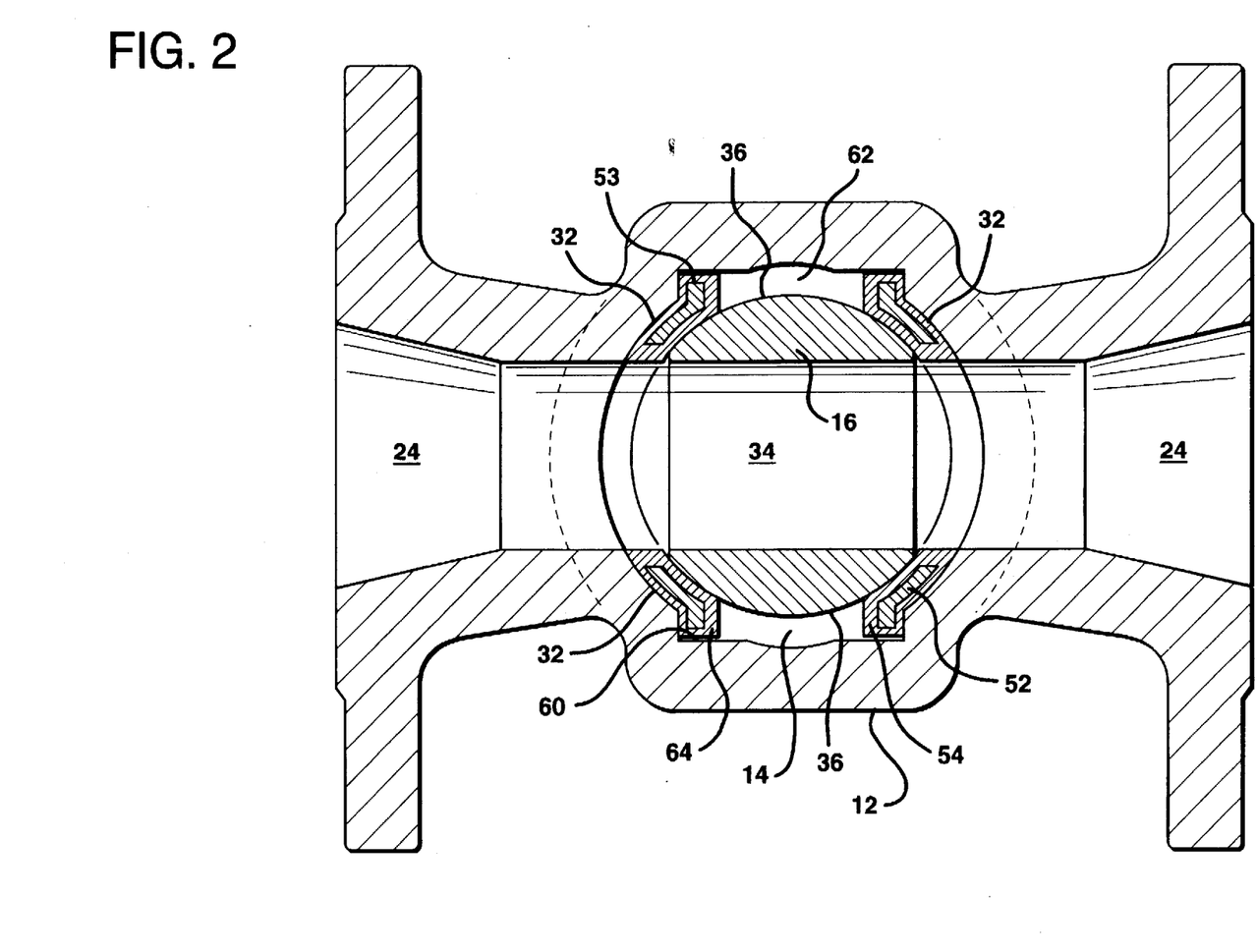
FIG. 2 is a sectional top view of the ball valve of the present invention taken along line 2—2 in FIG. 1.

Referring to FIGS. 1 and 2, there is seen the adjustable ball valve 10 of the present invention. The ball valve 10 comprises a valve body 12 with an internal chamber 14. A ball 16 is disposed within the chamber 14. The valve 10 further includes a valve stem 18 connected to the ball 16 for rotating the ball between open and closed positions. Seat members 20 are disposed in the chamber for supporting the ball as well as sealing the valve 10. An adjustment mechanism 22 provides the adjustability of the present invention.

Valve body 12, as well as ball 16, stem 18 and most other items, are formed of rigid alloy material. One of the skill in the art will recognize that the composition of the alloy is dependent upon the application. Valve body 12 may be internally coated with a corrosion resistant polymer such as polytetrafluoroethylene thereby providing support as well as corrosion resistance. Valve body 12 includes, along with chamber 14, flow channel 24. Flow channel 24 extends longitudinally through the entirety of valve body 12 thereby providing a passage for fluid flow. Valve body 12 may assume various configurations as desired for functionality as well as aesthetics.

Internal chamber 14 is preferably substantially tubular as FIG. 2. However, those skilled in the art will recognize that various other shapes may also be employed and remain within the scope of the invention. Chamber 14 includes chamber side wall 26 which is vertically tapered to allow for vertical adjustment of ball valve 10. By vertical taper it is intended that the upper portion 28 of the chamber is wider or greater in circumference than the lower portion 30. Preferably, the vertical taper of chamber 14 is substantially conical in nature. That is, when viewing chamber 14 from above, the chamber appears as a cone with the upper portion 28 greater in circumference than lower portion 30. However, the vertical taper may also be a flat taper with only the sides 32 of chamber 14 in sealing contact with seat members 20 being tapered. The degree of the vertical taper as measured from a vertical plane through chamber 14 is from about 1° to about 8°, preferably from about 1° to about 4°, and most preferably about 2°.

Ball 16 is disposed within internal chamber 14. Ball 16 may also be coated with a corrosion-resistant polymer. An orifice 34 extends through the entirety of the ball 16. Orifice 34 may also be internally coated with a corrosion-resistant polymer such as polytetrafluoroethylene. Ball 16 is adapted for rotation between open and closed positions. When ball 16 is rotated to the open position as shown in FIG. 2, orifice 34 is in alignment with flow channel 24 so that fluid is free to pass through both the orifice and the flow channel. When ball 16 is rotated to the closed position (not shown), orifice 34 is out of alignment with flow channel 24 so that ball side walls 36 block channel 24 and prevent the flow of fluid through the valve.

Figure 4:
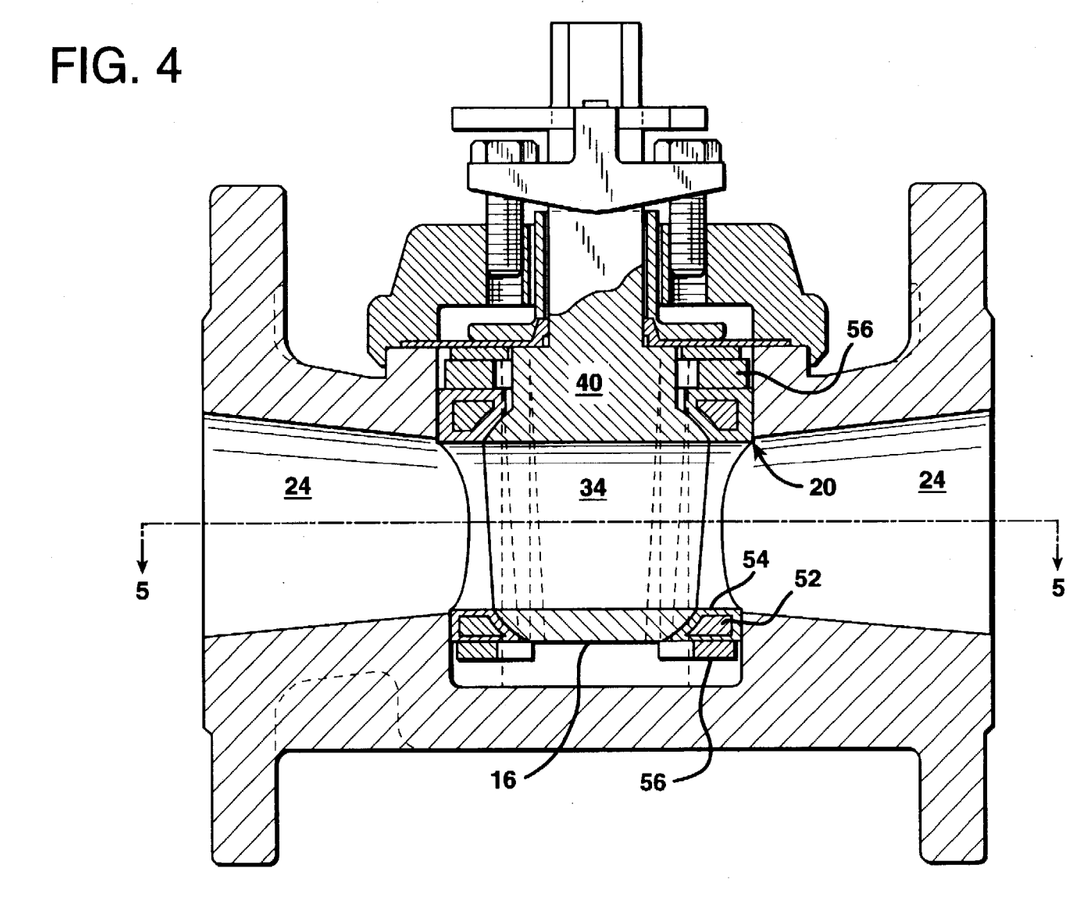
FIG. 4 is a sectional side view of an additional embodiment of the present invention.

Valve stem 18 is connected to ball 16 to rotate the ball between the open and closed positions. Stem 18 extends outside of valve body 12 so that external rotation of ball 16 is possible. Preferably, stem 18 is connected to ball 16 by means of a slot 38 disposed in the top of the ball and into which the stem projects, although various other connection means may be employed. Alternatively, stem 18 and ball 16 may be molded as a one-piece ball and stem assembly 40 as shown in FIG. 4.

Figure 8:
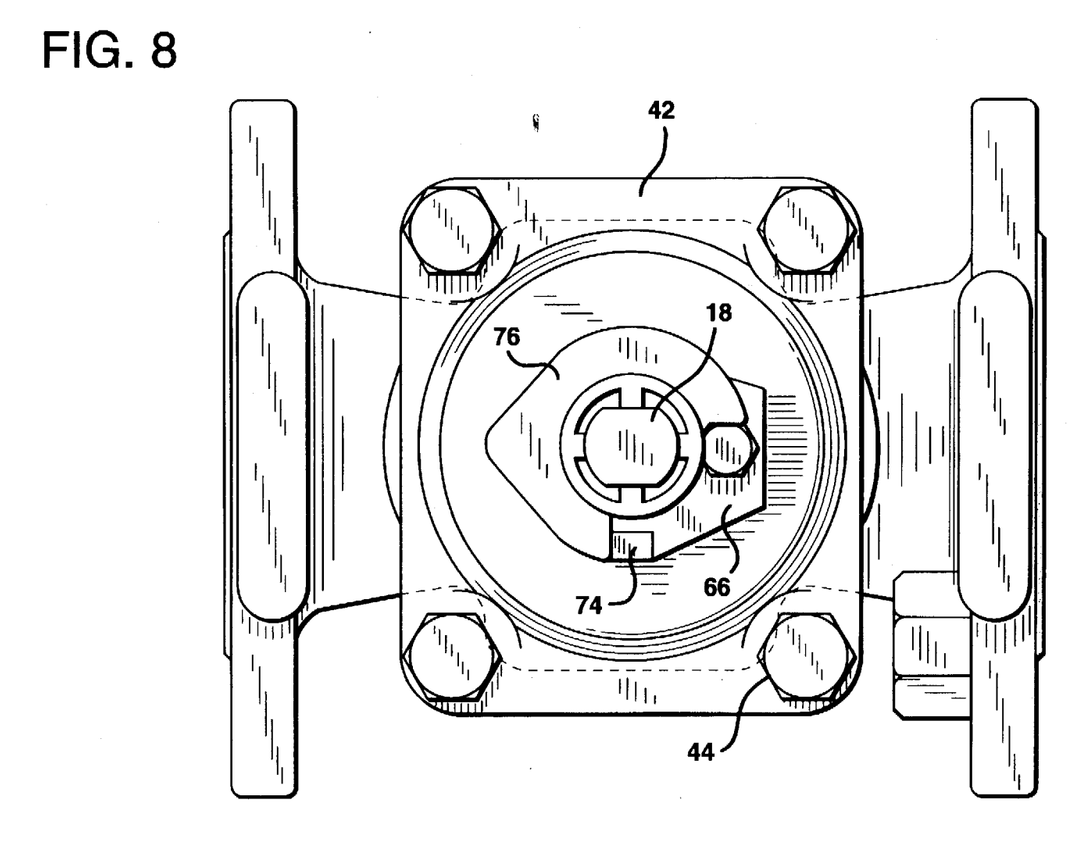
FIG. 8 is a top view of the valve of the present invention.
Figure 9:
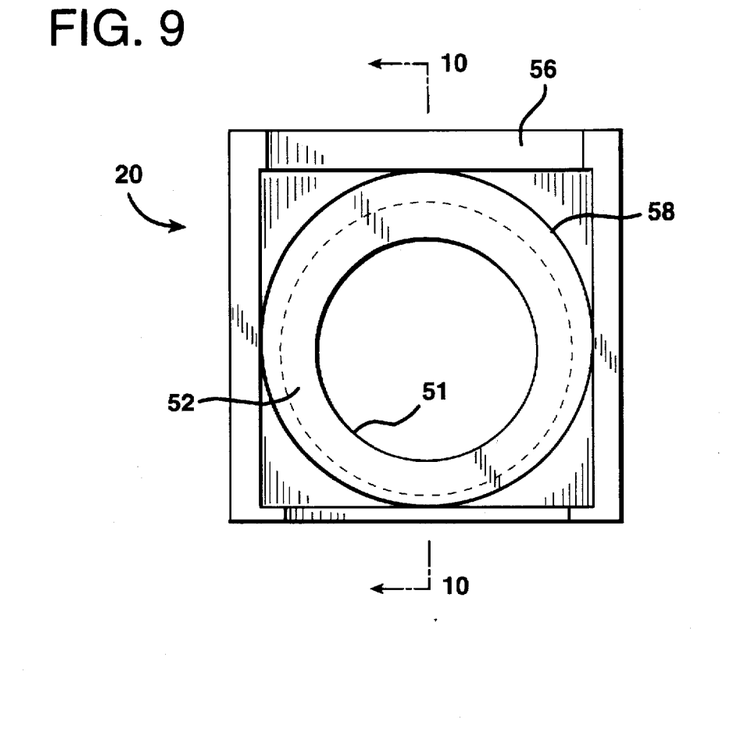
FIG. 9 is a front view of a seat member of the present invention including a retaining guide
Figure 10:
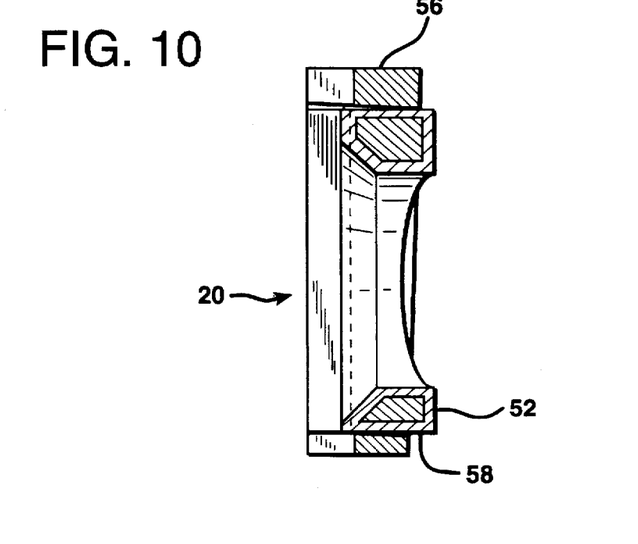
FIG. 10 is a cross-sectional side view of the seat member of FIG. 9.

Returning to FIG. 1, both ball 16 and stem 18 are held in chamber 14 by means of a top cap or bonnet 42. Meanwhile, bonnet 42 is held into position by fasteners 44 as seen in FIG. 8. Fasteners 44 can be any common fastener suitable for the purpose such as screws, bolts, pins, etc. Preferably, fasteners 44 are screws. Fasteners 44 and bonnet 42 hold ball 16 and stem 18 in chamber 14 without preventing free-movement of the ball and stem arrangement. That is, ball 16 and stem 18 remain free to rotate between open and closed positions. Further, the ball and stem arrangement remains free to be vertically adjusted within the chamber 14. A sealing arrangement is then employed to seal the valve stem 18 to the valve body 12 and prevent leakage. Such arrangements may include O-rings, stem packings, bellows seals and preferably, a diaphragm 46. Diaphragm 46 can be any suitable diaphragm for sealing purposes, but is preferably a reverse-lip diaphragm of a plastic material such as polytetrafluoroethylene. Of course, one of ordinary skill in the art will recognize that various arrangements may be employed in the present invention to prevent leakage around valve stem 18.

Ball 16 is supported by seat members 20 disposed within chamber 14. Seat members 20 serve the dual purpose of supporting ball 16 as well as sealing valve 10. Seat members 20 seal valve 10 by providing two sealing surfaces, one with the chamber wall 32 and one with ball 16. To allow external adjustment of the valve, seat members 20 are floating seats. That is, the seat members are not fixed in position within chamber 14, but rather, are free to "float" or move vertically within the chamber. Furthermore, seat members 20 are preferably a soft seat. That is, the seat members are preferably coated with a polymer material, such as a fluoropolymer. Soft seats provide a superior sealing surface to metal or ceramic seats. Additionally, soft seats require lower turning torque than metal or ceramic seats. However, for certain applications such as higher temperatures, metal and ceramic seats may be employed. Of course, one of skill in the art will recognize that various seat members and configurations may be employed within the scope of this invention.

Figure 6:
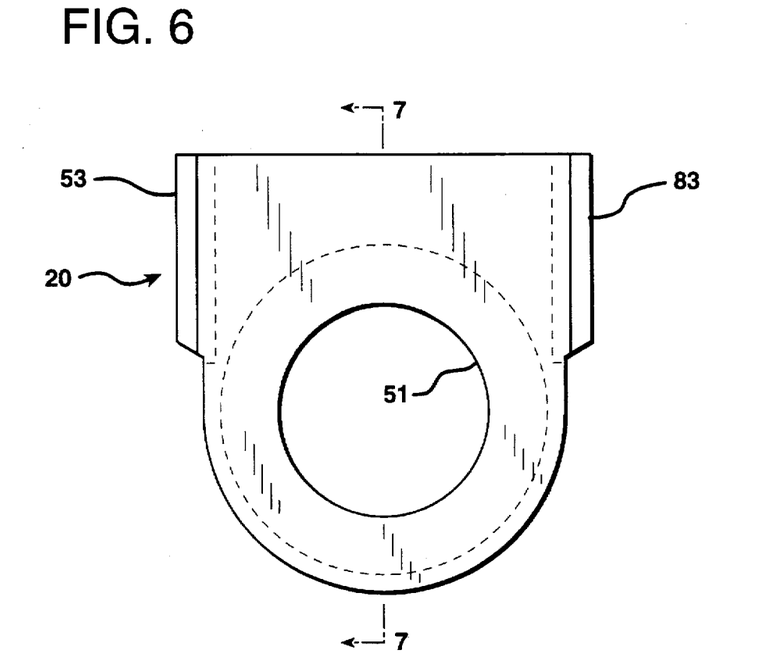
FIG. 6 is a front view of a seat member of the present invention.
Figure 7:
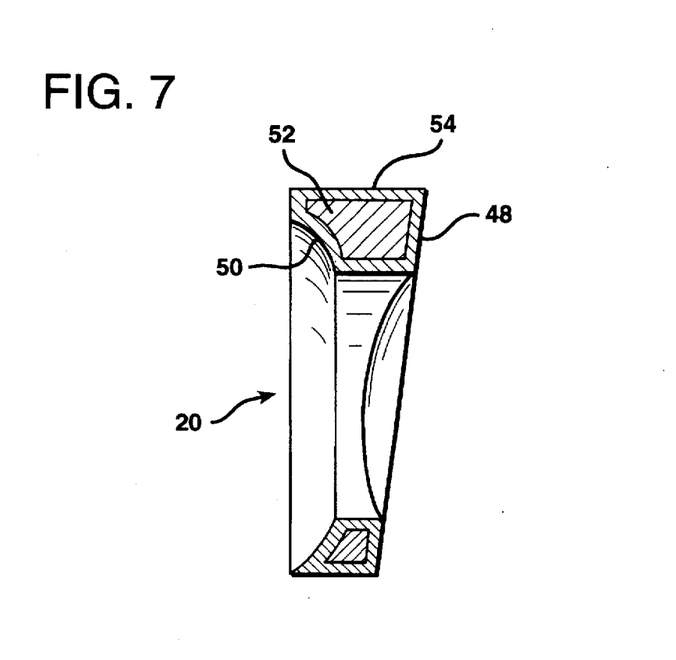
FIG. 7 is a cross-sectional side view of the seat member of FIG. 6.

Turning to FIGS. 6 and 7, there is seen the preferable seat members 20 of the present invention. Seat member 20 is substantially rectangular in nature. As can be seen in FIG. 7, seat member 20 is vertical tapered on one side 48 to correspond to the taper of chamber 14. This allows seat members 20 to be forced into the taper of chamber 14 by adjustment mechanism 22 thereby tightening both the seal with the chamber as well as the seal with ball 16. As seat members 20 are forced downward in chamber 14 into a narrower taper, seat members 20 have a smaller amount of volume which can be occupied. Thus, the seat members exert more outward force on the sealing surfaces, creating a tighter seal.

Figure 3:
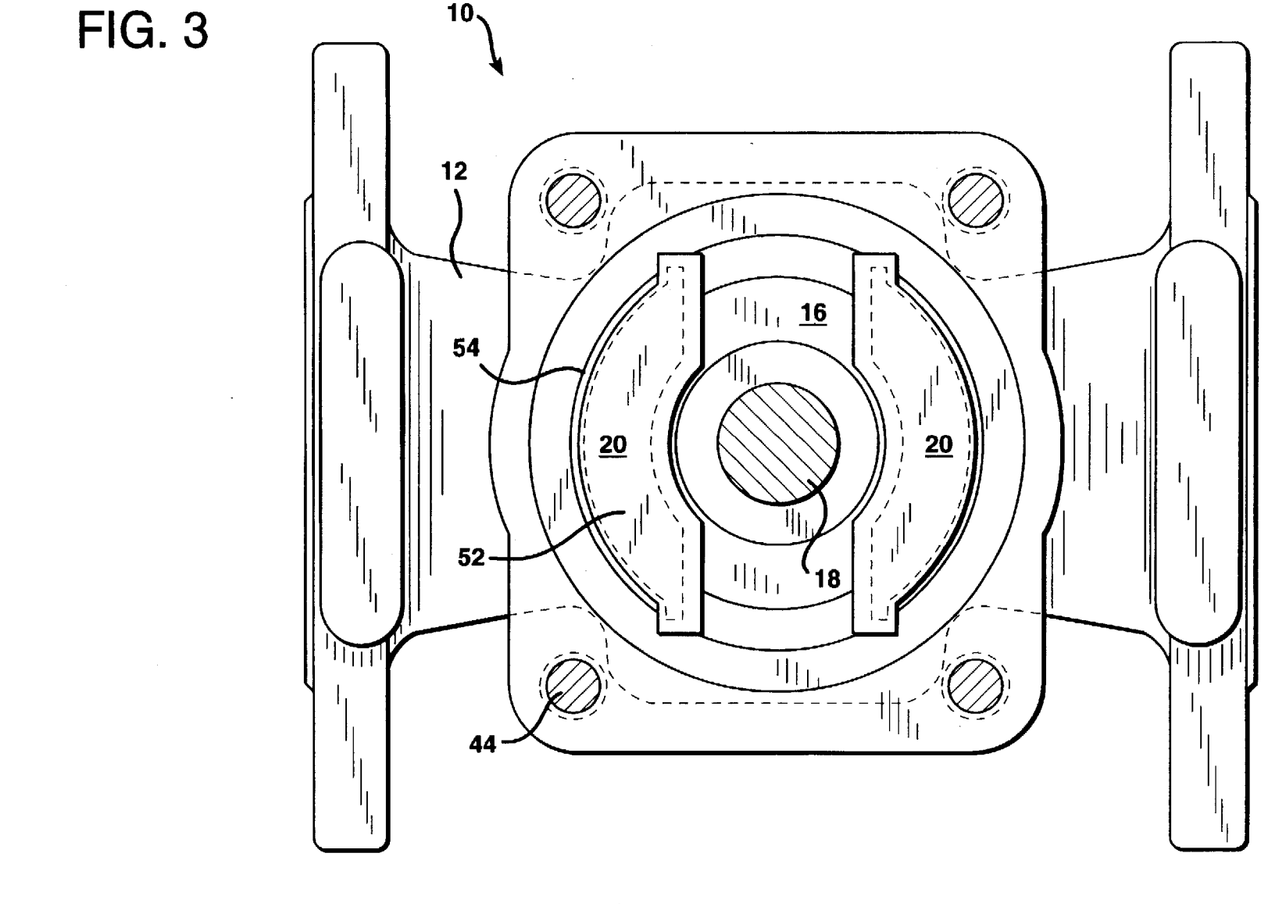
FIG. 3 is also a sectional top view of the ball valve of the present invention taken along line 3—3 in FIG. 1.

Meanwhile, the side 50 of seat members 20 in sealing contact with ball 16, is concave in nature corresponding to the curve of ball 16. A sealing surface 51 is thereby created with the ball 16. As can be seen in FIG. 3, seat members 20 surround a portion of ball 16 while providing a sealing arrangement. Furthermore, seat members 20 are vertically disposed in chamber 14 thereby allowing vertical adjustment of the valve.

Traditional soft ball valve seats have not afforded protection against blow-out. Once the pressure of the valve is elevated by throttling or other means, the seats begin to leak or fail completely. The preferable seat member 20 of the present invention provides superior protection against seat blow-out, which, in conjunction with the adjustability of the valve, allows the ball valve of the present invention to operate at much higher pressures than traditional valves.

Figure 11:
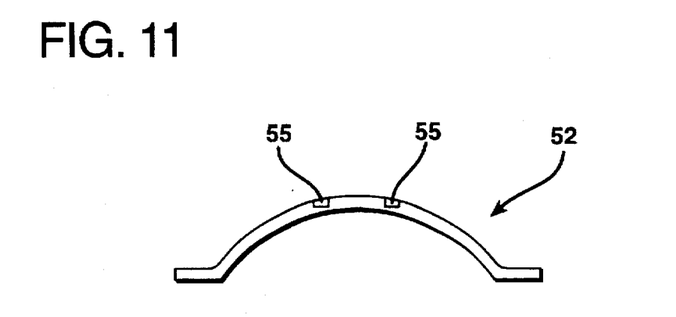
FIG. 11 is an end view of the support frame for the seat member of FIG. 6.

The preferred seat members 20 comprise a support frame 52 of a rigid, solid material encapsulated with a polymeric material 54 to provide a soft seat. As stated previously, support frame 52 is preferably rigid and solid. By "solid" it is meant that support frame 52 is essentially non-perforate. However, the definition of "solid" is not intended to preclude support frame 52 from having grooves, notches, indentations or areas of reduced thickness therein (or even holes such as locating holes 55 as shown in FIG. 11) as long as the surface of support frame 52 is substantially free of perforations. Support frame 52 preferably has a thickness of about 1/16th to about 3/8th of an inch and most preferably has a thickness of about 1/8th to about 3/16th of an inch. The height and width of support frame will be determined by the size of the valve in which seat 20 is used. Support frame 52 may be formed of any suitable material such as iron, various other metal compositions or alloys and ceramics.

Support frame 52 is completely encapsulated with the polymeric material 54. Polymeric material 54 has a thickness of about 30 to about 200 thousandths of an inch. In a preferred embodiment, polymeric material 54 will have a thickness of about 60 to about 150 thousandths of an inch and in a most preferred embodiment the thickness of polymeric material 54 is about 90 to about 110 thousandths of an inch. In this fashion, both the sealing surface with ball 16 and with chamber 14 have the benefit of a soft seal. Yet, the support frame 52 provides the rigidity the seats require to protect against blow-out. Thus, the preferred seats of the present invention provide support against blow-out without sacrificing sealability.

As can be seen in FIG. 11, support frame 52 includes, in its end, at least one and preferably two locating holes 55. Locating holes 55 are provided in support frame 52 to position support frame 52 in a mold so that it receives an even coverage of polymeric material 54. The encapsulation method and the function of locating holes 55 will be discussed in detail below. The other end of support frame 52, not shown, will also have at least one and preferably two locating holes 55. For proper positioning of support frame 52 in the mold, support frame will have a total of at least 3 and preferably four locating holes 55.

For additional support against blow-out, the seat members of the present invention may include an optional retaining guide. As can be seen in FIGS. 4–5 and 9–10, retaining guide 56 can be attached to seat members 20 at the outer surface 58 which is not in sealing contact with chamber 14, but rather, is in contact with a locking mechanism 60. Thus, retaining guide 56 provides additional support to seat member 20 when higher pressure drops are applied to the valve.

Figure 5:
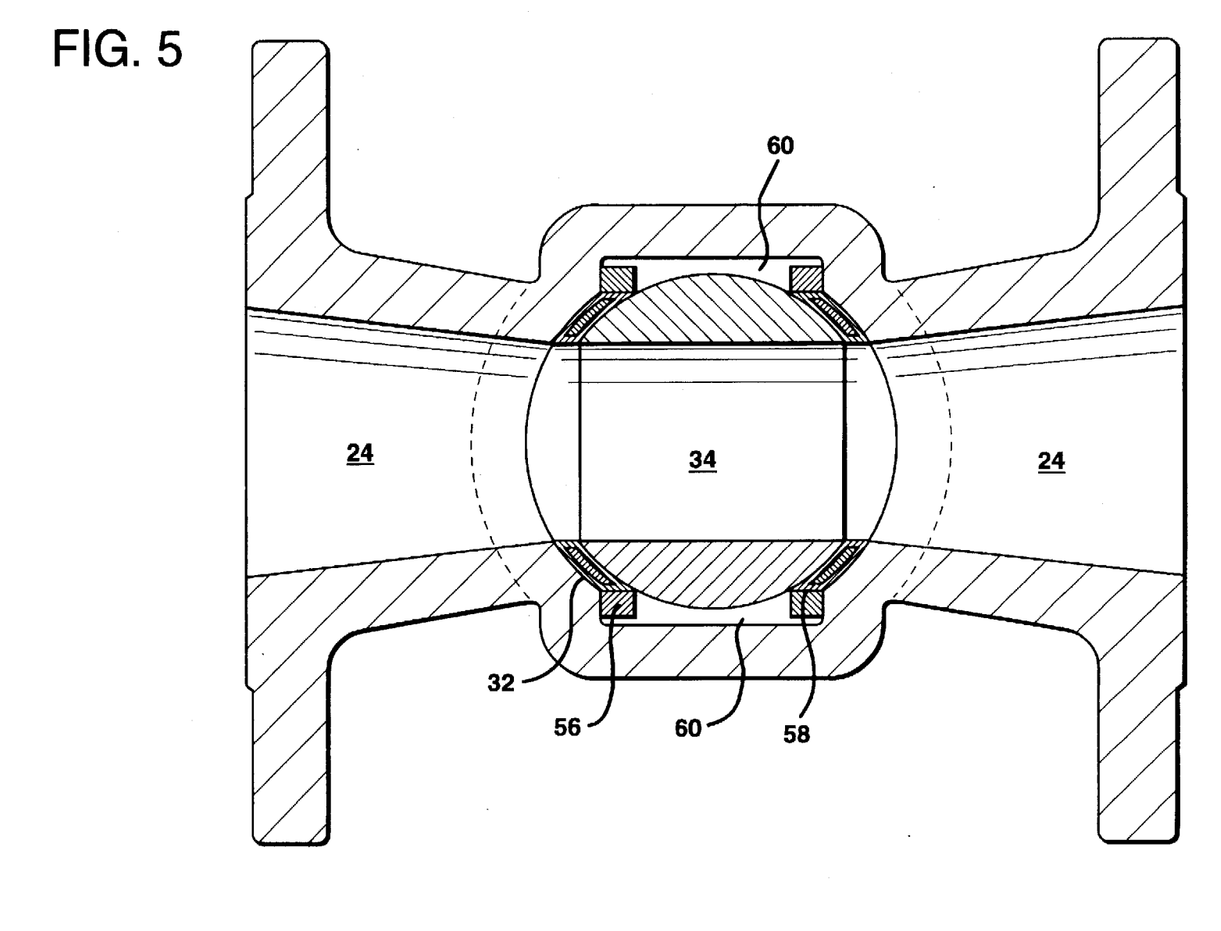
FIG. 5 is a top view of the ball valve of the present invention taken along line 5—5 in FIG. 4.

Turning to FIGS. 2 and 5, there is seen locking members 60 disposed within chamber 14. Locking members 60 prevent substantial horizontal or rotational movement of seat members 20 within the chamber. However, locking members 60 allow free vertical movement of seat members 20 in conjunction with the adjustment mechanism. By substantial movement it will be recognized that a minimal amount of movement is possible without departing from the scope of the invention. Rather, the purpose of locking members 60 is to prevent seat members 20 from leaving the position in which they will provide a sealing arrangement.

Locking members 60 are preferably slots disposed in the sides of chamber 14 into which a portion 64 of seat members 20 or, as depicted in FIG. 5, retaining guides 56, extend. By disposing slot 62 in both sides of chamber 14 and extending seat members 20 into the slots via portion 64 of retaining guide 56, horizontal or rotational movement in either direction is prevented or minimized. Alternatively, locking members 60 may include ribs disposed in the side of chamber 14 or pins extending into the chamber 14. However, one of skill in the art will recognize that various other arrangements may be employed as locking members 60 for preventing horizontal or rotational movement of seat members 20 without departing from the scope of the invention.

As previously discussed, the valve 10 of the present invention is externally adjustable to compensate for leaks in the valve due, in part, to seat wear or increased pressure. The adjustment mechanism of the present invention involves applying or reducing force on seat members 20, thereby manipulating the seat members vertically within the tapered chamber. With application of force, seat members 20 are wedged further into the taper, decreasing the available volume and tightening the seal between the seat members and both the chamber wall and the ball. As mentioned previously, such an adjustment mechanism is independent from the piping system into which the valve is incorporated and thus, superior to prior art ball valve adjustment involving spring biased seats or union nuts. One of ordinary skill in the art will, of course, recognize that various arrangement may be employed with which seat members 20 may be adjusted, and that the adjustment mechanism described herein is merely a preferred embodiment of the adjustment mechanism 22

FIG. 1 shows adjustment mechanism 22. Adjustment mechanism 22 comprises an adjuster 66 adapted to apply pressure to seat members 20. Adjuster 66 is preferably formed as a wedge-shaped collar, as shown in FIGS. 1 and 8, although other configurations may be employed. Adjuster 66 further includes a tab 74 extending upwardly. Tab 74, in conjunction with stop collar 76, prevents stem 18 and consequently, ball 16 from over-rotating when turning and potentially damaging seat members 20. As seen in FIG. 8, stop collar 76 is attached to stem 18 and is preferably formed as a ring with a quarter-section removed. Again, however, various other configurations may be employed. As stem 18 is rotated, stop collar 76 is correspondingly rotated Tab 74 then limits the range of motion of stop collar 76 and stem 18 to that within the removed quarter-section.

Returning to FIG. 1, adjuster 66 is preferably adapted to press against seat members 20 through the use of thrust collar 68. Fasteners 70 can be manipulated to apply a load through adjuster 66 to thrust collar 68. Fasteners 70 preferably comprise screws which pass through adjusting plate 66 and into bonnet 42. Fasteners 70 can be externally tightened to increase the pressure applied adjuster 66.

Figure 12:
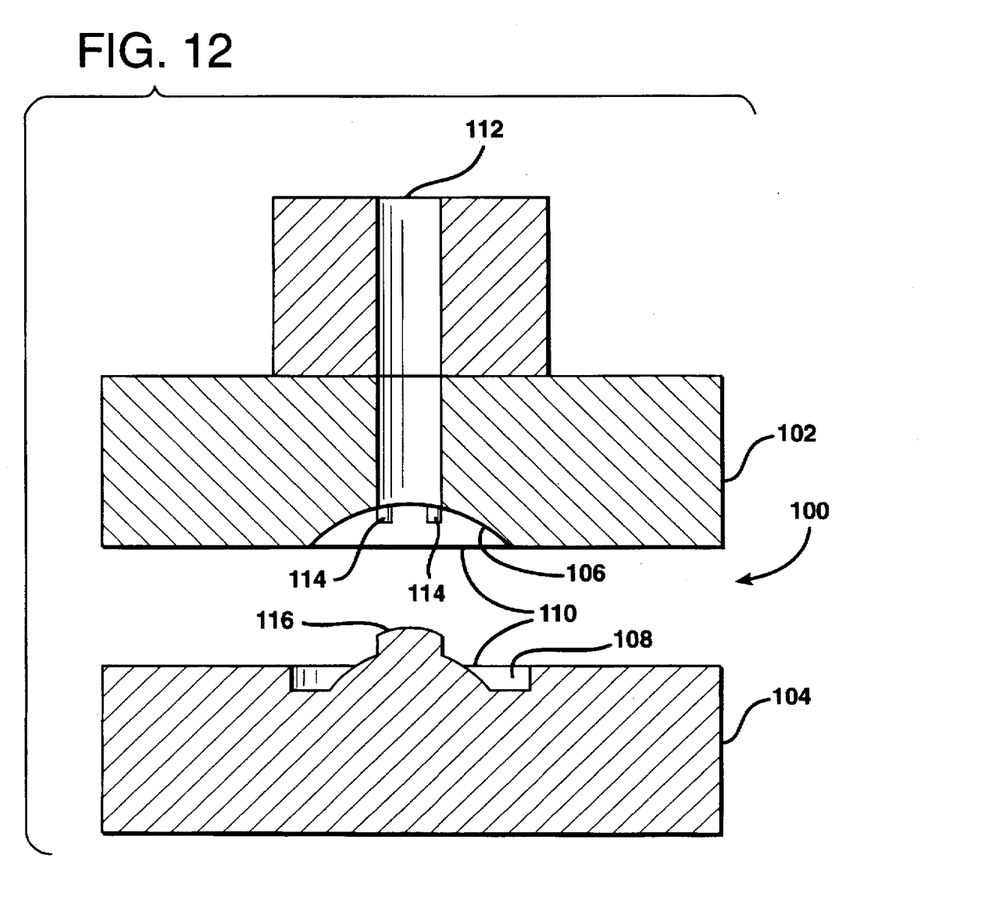
FIG. 12 is a sectional view of a mold used to encapsulate the rigid, solid support frame of the seat member in a polymeric material.

As fasteners 70 are manipulated, adjuster 66 is drawn against thrust collar 68 thereby increasing the pressure applied to thrust collar 68 and transferring the applied load. Hollow space 72 provides an area of movement for thrust collar 68. As the load transferred to thrust collar 68 is increased, load is transferred through diaphragm 46 to thrust plate 78. Thrust plate 78 then acts to apply force against seat members 20 and force both the seat members and ball 16 downward into the more narrowly tapered portion of chamber 14. In this fashion, adjustment mechanism 22 is capable of externally adjusting ball valve 10. Of course, one of skill in the art will recognize that above described adjustment mechanism is merely the preferred mechanism and that various other mechanisms and modifications are possible while remaining within the scope of the invention FIG. 12 shows a cross sectional view of a mold which can be used to encapsulate support frame 52 of seat member 20 in polymeric material 54. The mold 100 comprises a first, upper plate 102 and a second, lower plate 104. Upper plate 102 has a first cavity 106 formed therein and lower plate 104 has a second cavity 108 formed therein. When the two mold plates are brought together, first cavity 106 and second cavity 108 form an opening 110 having the shape and dimensions of an encapsulated seat member 20. Upper plate 102 also includes injection sprue 112 which is provided to feed polymeric material into opening 110 and enters first cavity 106 perpendicular to upper plate 102.

Mold 100 also includes pins 114 which are provided to position support frame 52 in opening 110 so that support frame 52 receives an even coverage of polymeric material 54 during the molding process. Pins 114 are positioned in mold 100 so that they contact locating holes 55 in each end of support frame 52 to position support frame 52 approximately in the center of opening 110 so that support frame 52 receives an even coverage of polymeric material 54. There are at least three and preferably four pins 114. When three pins 114 are employed, two of the pins will be positioned so that they contact locating holes 55 in one end of support frame 52 in a spaced apart relation while the other pin will be positioned so that it contacts a locating hole 55 in the opposite end of support frame 52. The engagement of pins 114 with locating holes 55 in support frame 52 prevents support frame 52 from moving vertically in opening 110 and also prevents the sides of support frame 52 from rotating toward the top of opening 110 as polymeric material 54 is injected into opening 110.

Finally, mold 100 includes a core 116 which prevents polymeric material 54 from covering the center aperture of seat 20. Core 116 is located on lower plate 104.

Support frame 52 is encapsulated in polymeric material 54 in the following manner Support frame 52 is placed into second cavity 108 in lower plate 104 of mold 100. Pins 114 are extended so that they contact and engage locating holes 55. After support frame 52 has been positioned in cavity 108, upper plate 102 and lower plate 104 are brought together to close mold 100 so that first cavity 106 and second cavity 108 form opening 110.

Once mold 100 has been closed and opening 110 has been formed, a heated, fluent polymeric material is injected into injection sprue 112 and into opening 110. The polymeric material is fed into opening 110 around core 116 so that support frame 52 is completely encapsulated in polymeric material 54. As polymeric material 54 is fed into opening 110, the flow of polymeric material 54 would force support frame 52 upwardly in the mold if not for pins 114. To provide support frame 52 with an even coverage of polymeric material 54, pins 114 prevent support frame 52 from being forced upwardly in opening 110 toward the top of cavity 106 while the polymeric material is being injected into opening 110. Pins 114 contact locating holes 55 so that support frame 52 is spaced away from the inner diameter of opening 110 a distance slightly greater than the desired depth of coating for support frame 52.

After a volume of polymeric material 54 sufficient to encapsulate support frame 52 has been fed into opening 110, the feeding of polymeric material 54 into mold 100 is ceased and mold 110 is then cooled. As mold 100 is being cooled, pins 114 are retracted from contact with locating holes 55. Because mold 100 and polymeric material 54 cool from the outside inwardly, once pins 114 are retracted, polymeric material 54, which has not yet solidified, flows into the space previously occupied by pins 114 to complete the encapsulation of support frame 52. Mold 100 is then cooled further to complete the curing of polymeric material 54.

Once mold 100 has been sufficiently cooled, upper plate 102 is separated from lower plate 104 to open mold 100. The polymerically encapsulated seat member 20 is then removed from mold 100. As stated above, the thickness of the layer of polymeric material 54 on support frame 52 is about 30 to about 200 thousandths of an inch. Preferably, the thickness of polymeric material 54 is between about 60 and about 150 thousandths of an inch and most preferably between about 90 and 110 thousandths of an inch.

Polymeric material 54 used in the present invention is preferably a melt processable polymer. Melt processable polymers are well known to those of skill in the art. Examples of suitable polymers include various members of the fluoropolymer family, which includes Teflon PFA®, Teflon FEP® and Tefzel®, all of which are available from DuPont de Nemours & Co. of Wilmington, Del., and Ryton® which is available from the Phillips Petroleum Company of Bartlesville, Okla. Ryton® has been found to be particularly effective in high temperature applications. In a more preferred embodiment, polymeric material 54 is Teflon PFA®. The use of a melt processable polymer allows a rigid, solid support frame to be used for seat member 20 because it is no longer necessary to provide a piece of metal with perforations to cause polymeric material to remain attached to that piece of metal.

To provide for proper processabilty of the polymeric material during the molding process, both mold 100 and the polymeric material are preferably heated. For example, if the polymeric material is a fluoropolymer, the material should be heated to a temperature between about 400° F. (204° C.) and about 650° F. (343° C.) and preferably between about 580° F. (304° C.) and about 620° F. (327° C.). Mold 100 is preferably heated to a temperature which ranges from approximately 400° F. (204° C.) to approximately 600° F. (316° C.) before the polymeric material is injected to prevent premature curing of the polymeric material If mold 100 is not heated, polymeric material will freeze on support frame 52 in a series of layers which reduces the structural stability of seat members 20.

Although mold 100 has been described herein as comprising an "upper" plate 102 and a "lower" plate 104, the designations, "upper" and "lower," are provided solely to facilitate reference to the figure. Mold 100 could have a vertical orientation or any other orientation which would facilitate its operation. Furthers although injection sprue 112 is described in relation to upper plate 102, one skilled in the art will appreciate that the position of sprue 112 depends upon the positioning of mold 100.

Several qualities of the ball valve of the present invention make it superior to prior art ball valves. First, the present invention provides a ball valve with vertical adjustment which is independent from any piping system into which it is incorporated and does not place undue stress upon the valve seat members. Thus, a valve which can be easily and efficiently be adjusted to compensate for leaks due, in part, to seat wear has been provided. Further the ball valve of the present invention provides seat members of rigid support frames encapsulated with a polymeric material, which by themselves and in conjunction with the adjustability feature of the valve, provide increased protection against blow-out and consequently operability at higher pressures than possible with conventional ball valves.

The encapsulation method of this invention also offers advantages. First, it provides an inexpensive and effective method for encapsulating valve seats. Second, it provides a method for encapsulating valve seats in which a rigid, solid support frame is evenly encapsulated with a polymeric material.

Having described the invention the invention in detail and by reference to the preferred embodiments thereof, it will be apparent that modifications and variations are possible without departing from the scope of the invention which is defined in the appended claims.

What is claimed is:

1. An adjustable ball valve assembly comprising:

a valve body having an internal chamber formed therein, said internal chamber having a vertical taper whereby the upper portion of said chamber is wider or greater in circumference than the lower portion of said chamber;

a ball disposed within said chamber;

a valve stem connected to said ball and adapted to rotate said ball between open and closed positions;

seat members disposed in said chamber for supporting said ball, each seat member having a sealing surface with the outer surface of said ball and a sealing surface with the inner surface of said chamber, the sealing surface of said seat member in contact with the inner surface of said chamber having a vertical taper corresponding to the vertical taper of said chamber, and each seat member comprising a rigid, solid support frame completely encapsulated in a polymeric material;

locking members disposed in said chamber for preventing substantial horizontal or rotational movement of said seat members yet allowing for vertical adjustment, said locking members being slots disposed in the sides of said chamber into which portions of said seats extend; and an adjustment mechanism for adjusting said ball and seat members vertically within said chamber, said adjustment mechanism comprising an adjuster adapted to apply pressure to said seat members, one or more fasteners extending through said adjuster for applying pressure to said adjuster and a collar in contact with said adjuster for transferring pressure to said seat members.

2. The adjustable ball valve assembly of claim 1 wherein the vertical taper of said chamber is from about 1° to about 8° as measured from a vertical plane.

3. The adjustable ball valve assembly of claim 2 wherein the vertical taper of said chamber is about 2° to about 4° as measured from a vertical plane.

4. The adjustable ball valve assembly of claim 1 wherein said stem and said ball comprise a one-piece ball and stem assembly.

5. The adjustable ball valve assembly of claim 1 wherein said seat members comprise a metal support frame encapsulated with a melt-processable polymer.

6. The adjustable ball valve assembly of claim 5 wherein said melt-processable polymer is a fluoropolymer.

7. The adjustable ball valve assembly of claim 1 wherein said seat members further include a rigid retaining guide.

8. The adjustable ball valve assembly of claim 1 wherein said vertical taper comprises a flat taper or a conical taper.

9. The adjustable ball valve assembly of claim 1 wherein said locking members are rib or depressions formed in the inner surface of said chamber, or pins extending into said chamber.

10. The adjustable ball valve assembly of claim 1 wherein said polymeric material on said support frame has a thickness between about 30 and about 200 thousandths of an inch.

11. The adjustable ball valve assembly of claim 10 wherein said polymeric material on said support frame has a thickness between about 60 and about 150 thousandths of an inch.

12. The adjustable ball valve assembly of claim 11 wherein said polymeric material on said support frame has a thickness between about 90 and about 110 thousandths of an inch.

13. The adjustable ball valve assembly of claim 1 wherein said support frame has a thickness of about 1/16th to about 3/8th of an inch.

14. The adjustable ball valve assembly of claim 13 wherein said support frame has a thickness of about 1/8th to about 3/16th of an inch.

15. An adjustable ball valve assembly comprising:
a valve body having an internal chamber formed therein;
a ball disposed within said chamber and adapted to rotate between open and closed positions;
seat members disposed in said chamber for supporting said ball, each seat member having a sealing surface with the outer surface of said ball and a sealing surface with the inner surface of said chamber, said seat members comprising a rigid, solid support frame completely encapsulated in a polymeric material and each of said seat members further including a rigid retaining guide also encapsulated in said polymeric material;
locking members disposed in said chamber for preventing substantial horizontal or rotational movement of said seat members yet allowing for vertical adjustment, said locking members being slots disposed in the sides of said chamber into which portions of said retaining guides for said seats extend; and
an external adjustment mechanism for adjusting said ball and seat members vertically within said chamber, said adjustment mechanism comprising an adjuster adapted to apply pressure to said seat members, one or more fasteners extending through said adjuster for applying pressure to said adjuster and a collar in contact with said adjuster for transferring pressure to said seat members.

16. The adjustable ball valve of claim 15 further including a thrust plate in contact with said collar for transferring pressure to said seat members.

17. The adjustable ball valve of claim 15 wherein said melt-processable polymer is a fluoropolymer.

18. The adjustable ball valve of claim 15 wherein said support frame has a thickness of about 1/16th to about 3/8th of an inch.

19. The adjustable ball valve of claim 18 wherein said support frame has a thickness of about 1/8th to about 3/16th of an inch.

* * * * *